(12) United States Patent
Ozanne et al.

(10) Patent No.: US 10,398,253 B2
(45) Date of Patent: Sep. 3, 2019

(54) BEVERAGE PRODUCTION MACHINE USING CAPSULES

(71) Applicant: NESTEC S.A., Vevey (CH)

(72) Inventors: Matthieu Ozanne, Publier (FR); Didier Vuagniaux, Gimel (CH)

(73) Assignee: Societe des Produits Nestle S.A., Vevey (CH)

( * ) Notice: Subject to any disclaimer, the term of this patent is extended or adjusted under 35 U.S.C. 154(b) by 689 days.

(21) Appl. No.: 14/916,387

(22) PCT Filed: Aug. 26, 2014

(86) PCT No.: PCT/EP2014/068064
§ 371 (c)(1),
(2) Date: Mar. 3, 2016

(87) PCT Pub. No.: WO2015/032651
PCT Pub. Date: Mar. 12, 2015

(65) Prior Publication Data
US 2016/0198890 A1    Jul. 14, 2016

(30) Foreign Application Priority Data

Sep. 3, 2013    (EP) ..................................... 13182849

(51) Int. Cl.
*A47J 31/36*      (2006.01)
*A47J 31/40*      (2006.01)

(52) U.S. Cl.
CPC ........... *A47J 31/407* (2013.01); *A47J 31/369* (2013.01); *A47J 31/3633* (2013.01); *A47J 31/405* (2013.01)

(58) Field of Classification Search
CPC ................ A47J 31/3633; A47J 31/3628; A47J 31/3695; A47J 31/369; A47J 31/405; A47J 31/407

(Continued)

(56) References Cited

U.S. PATENT DOCUMENTS 8,176,840 B2    5/2012   Jarisch
8,210,096 B2 *    7/2012   Fin ...................... A47J 31/3638
                                                                                       99/295

(Continued)

FOREIGN PATENT DOCUMENTS

CN        101453930 A    6/2009
CN        102892340 A    1/2013

(Continued)

*Primary Examiner* — Dana Ross
*Assistant Examiner* — Joseph W Iskra
(74) *Attorney, Agent, or Firm* — K&L Gates LLP

(57) ABSTRACT

The invention concerns a beverage production machine designed for producing a beverage from a capsule comprising a module (1) for introducing the capsule in the machine, positioning the capsule for the beverage preparation and ejecting the capsule, said module comprising:—a housing (2) having two lateral walls (2a, 2b) and rear and front ends (2c, 2d),—a capsule engagement member (3),—an actuator (4) comprising a handle (41), wherein:—each of the lateral walls of the housing comprises a guiding curve (23a, 23b),—the capsule engagement member comprises two lateral guiding pins (31a, 31b), each of the lateral guiding pins cooperating with one of the guiding curves (23a, 23b) of the housing lateral walls,—the actuator comprises: a fixed axis (42), the actuator being able to rotate around said fixed axis, two lateral walls (43a, 43b) joining the rear end (41a) of the actuator handle to the fixed axis (42), each of said lateral walls comprising a guiding curve (431a, 431b) cooperating with the lateral guiding pins (31a, 31b) of the capsule engagement member.

11 Claims, 7 Drawing Sheets

(58) Field of Classification Search
USPC .............................. 99/295, 302 P, 289 R, 297
See application file for complete search history.

(56) References Cited

U.S. PATENT DOCUMENTS

| | | | |
|---|---|---|---|
| 9,237,823 B2 | 1/2016 | Ozanne et al. | |
| 9,560,930 B2 | 2/2017 | Fin et al. | |
| 2002/0124736 A1* | 9/2002 | Kollep ................ | A47J 31/0668 99/289 R |
| 2004/0031394 A1 | 2/2004 | Yaokim et al. | |
| 2007/0221066 A1 | 9/2007 | Sullivan et al. | |
| 2010/0224077 A1 | 9/2010 | Jing | |
| 2011/0017072 A1 | 1/2011 | Frigeri et al. | |
| 2011/0226132 A1 | 9/2011 | Vicentini et al. | |
| 2012/0199007 A1 | 8/2012 | Larzul et al. | |
| 2013/0064948 A1* | 3/2013 | Ozanne ................ | A47J 31/3638 99/289 R |
| 2013/0142931 A1 | 6/2013 | Fin et al. | |
| 2013/0149424 A1 | 6/2013 | Fischer | |

FOREIGN PATENT DOCUMENTS

| | | |
|---|---|---|
| EP | 1659547 A1 | 5/2006 |
| EP | 1950150 A1 | 7/2008 |
| EP | 2033551 | 3/2009 |
| EP | 2080454 A1 | 7/2009 |
| EP | 2283755 | 2/2011 |
| WO | 2248451 A1 | 11/2010 |
| WO | 2010146101 A1 | 12/2010 |
| WO | 2011138723 A1 | 11/2011 |
| WO | 2012046195 A1 | 4/2012 |
| WO | 2012072761 A1 | 6/2012 |
| WO | 2013008137 A1 | 1/2013 |
| WO | 2013086760 A1 | 6/2013 |

* cited by examiner

BEVERAGE PRODUCTION MACHINE USING CAPSULES

CROSS REFERENCE TO RELATED APPLICATIONS

The present application is a National Stage of International Application No. PCT/EP2014/068064, filed on Aug. 26, 2014, which claims priority to European Patent Application No. 13182849.3, filed Sep. 3, 2013, the entire contents of which are being incorporated herein by reference.

FIELD OF THE INVENTION

The present invention relates to the field of producing beverages or other liquid comestibles on the basis of ingredients which are contained in a capsule.

BACKGROUND OF THE INVENTION

Machines for preparing beverages by injecting a fluid in a capsule are well-known. The method of preparing a beverage is in principle as follows. The capsule is inserted into the beverage production module of a beverage production machine. The module is designed to inject a liquid such as for example hot water into the capsule in order to have the liquid interacts with the ingredients contained in the capsule. Note that some beverage production techniques ask for a pressurized injection like coffee beverage, others such as e.g. brewing tea can be made at ambient pressure. The invention can find application in both scenarios. The result of the interaction, i.e. the produced beverage or liquid comestible, is then drained from the capsule and fed to a receptacle such as e.g. a cup placed below an outlet for the beverage.

The invention relates particularly to beverage production machines comprising a module with a capsule engagement member, which can be displaced from a capsule insertion position to a beverage preparation position and then put back to the capsule insertion position. The module comprises means for ejecting the capsule from the capsule engagement member during this last step. Such a machine presents the advantage of having a capsule discharge position which is offset relative to the beverage production position. This advantage is of interest when the machine and the capsule are conceived for delivering the beverage directly out of the capsule in a cup without the beverage contacting the machine since it enables the discharge of the capsule in a position which is offset relative to the vertical of the beverage flow path. Such a beverage production machine is described in EP-A1-2 033 551.

In such a machine, the capsule is introduced in the beverage production module, retained by pre-fixation arms in a pre-engagement position and then engaged by a capsule engagement member that is conformal to the capsule shape further to the movement of the engagement member to the capsule. At the end of this movement, the capsule is clamped between the capsule engagement member and another part of the machine and the diluent, generally water, can be introduced to interact with the ingredients in the capsule. The resulting beverage flows out of the capsule either through an outlet provided in the capsule or/and produced by the machine during the capsule engagement and falls by gravity in a cup. Once the beverage has been delivered, the capsule engagement member moves back to the capsule discharge position dragging the capsule towards a position offset relative to the vertical of the beverage flow path. The movement of the capsule engagement member is a combination of a linear movement and an end swivelling movement that helps for the disengagement of the capsule since it can fall by gravity from the capsule engagement member.

This particular movement of the capsule engagement member is obtained by guiding pins attached to the lateral sides of the capsule engagement member in two guiding curves simultaneously. The first guiding curve is designed in the housing of the module and the second guiding curve is designed in one of the linkages of a knee joint mechanism. The end of the knee joint mechanism is a handle which—when actuated—enables the displacement of the capsule engagement member through both guiding curves.

A problem of the knee joint mechanism is that it comprises numerous different components. The procurement of these different components raises the price of production of the machine. Their assembly is long and raises the price of manufacturing of the machine too.

The object of the present invention is to propose an alternative mechanism for the implementation of the same movement of the capsule engagement member, said mechanism being less expensive to produce than the known knee joint mechanism.

SUMMARY OF THE INVENTION

The invention concerns a beverage production machine designed for producing a beverage from a capsule comprising a module for introducing the capsule in the machine, positioning the capsule for the beverage preparation and ejecting the capsule, said module comprising:
- a housing having two lateral walls and rear and front ends and one upper opening designed for introducing a capsule in the machine at the housing front end,
- a capsule engagement member which can be displaced longitudinally within the housing lateral walls between two positions, one first position being a capsule insertion or ejection opened position near the housing rear end and another second position being a beverage preparation closed position near the housing front end,
- an actuator comprising a handle designed for opening and closing the housing upper opening designed for introducing a capsule in the machine, wherein:
- each of the lateral walls of the housing comprises a guiding curve,
- the capsule engagement member comprises two lateral guiding pins, each of the lateral guiding pins cooperating with one guiding curve of one of the housing lateral walls, which cooperation is designed to displace the capsule engagement member between the two positions
- the actuator comprises:
  - a fixed axis perpendicularly attached to and between the housing lateral walls at the housing rear end, the actuator being able to rotate around said fixed axis,
  - two lateral walls joining the rear end of the actuator handle to the fixed axis, each of said lateral walls comprising a guiding curve cooperating with one lateral guiding pin of the capsule engagement member.

The module for producing a beverage of the machine of the present invention can present most of the features of the module described in EP-A1-2 053 551. It comprises a housing that defines the space in which the capsule is introduced and handled for the preparation of a beverage. The housing presents two lateral walls, rear and front ends and one upper opening designed for introducing a capsule in the machine near the housing front end. This upper opening is opened or closed by a handle, which is usually manually activated. This handle is part of the actuator that enables the movement of the capsule inside the beverage production module.

In the present application the terms "rear", "front", "lateral", "upper" are used to describe the relational positioning of features of the invention. These terms should be understood to refer to the machine in its normal orientation when used for the production of a beverage as shown for example in FIGS. 1, 2 and 8a to 8e.

The module comprises a capsule engagement member which can be displaced longitudinally within the housing lateral walls between two positions. A first position of the capsule engagement member enables the insertion or ejection of the capsule respectively in or from the capsule engagement member. Preferably the capsule engagement member presents a shape conformal to the capsule shape. This member is opened in insertion or ejection position. In this first position the capsule engagement member is near the housing rear end. A second position of the capsule engagement member enables the beverage preparation inside the capsule. In this second position the capsule is maintained between the capsule engagement member and the front end of the housing.

Preferably the front end of the housing comprises an opening member configured for opening a part of the capsule in order to enable the evacuation of the beverage from the capsule. This opening member can be the device described in WO 2010/146101

Preferably the front end of the housing comprises an identification member configured for cooperating with the capsule and identifying it. This identification member can be the device described in EP 1 950 150.

Preferably the housing comprises arms for prepositioning the capsule in the housing when it is introduced through the upper opening at the housing front end and before the capsule engagement member is moved by the actuator to engage the capsule.

According to the preferred embodiment the capsule engagement member comprises a fluid injection needle for piercing and introducing a fluid in the capsule. Usually the needle protrudes inside the capsule engagement member from the rear side of said member. The capsule is opened by the needle when the capsule is engaged inside the capsule engagement member. According to this preferred embodiment the rear end of the capsule engagement member is connected to a fluid supply so that the fluid—usually water—is injected inside the capsule through the needle. In the present invention a needle such as described in EP 2 080 454 can be used.

The module comprises means for displacing the capsule engagement member between the two positions. The capsule engagement member comprises two lateral guiding pins, each of said lateral guiding pins being able to slide in one of the guiding curves of the housing lateral wall. On each lateral side the pin slides in a guiding curve designed inside the housing lateral wall. The design of said guiding curves in the housing lateral wall defines the spatial movement of the capsule engagement member in the internal space of the housing. According to the preferred embodiment, each of the lateral walls of the housing comprises a guiding curve composed of at least two different segments, which segments are:

an essentially horizontal linear segment near the front end of the housing, and an inclined segment being raised to the capsule insertion or ejection position near the rear end of the housing.

The lateral pins of the capsule engagement member following these guiding curves in the housing lateral walls drive the capsule engagement member in a movement corresponding to said curves. For guiding curves composed of at least two different segments such as described hereabove the capsule engagement member is moved according to the combination of a linear displacement near the front end of the housing and an inclined displacement near the rear end of the housing. This change of direction during the displacement of the capsule engagement member creates a swivelling movement that improves the disengagement and ejection of the capsule when the capsule engagement member moves from the second position to the first position.

According to the present invention the actuator comprises a fixed axis perpendicularly attached between the housing lateral walls at the housing rear end, the actuator being able to rotate around said fixed axis. At its front end the actuator comprises the handle which is made rotatable around this fixed axis to open and close the upper opening in the housing. The actuator comprises two lateral walls joining the rear end of the actuator handle to the fixed axis. Preferably the rear end of each of the actuator lateral walls comprises a hole in which the actuator fixed axis is engaged. Consequently the movement of the handle induces the movement of the lateral walls around the fixed axis. Each of the lateral walls of the actuator comprises a guiding curve cooperating with one lateral guiding pin of the capsule engagement member.

The design of the guiding curves inside the actuator lateral walls is such that the rotation of the handle around the actuator fixed axis induces the displacement of the capsule engagement member lateral guiding pins in the guiding curves of the housing lateral walls.

According to the preferred embodiment the handle and the two lateral walls of the actuator are made of one single piece of material. Preferably the actuator is in plastic and is injection molded.

According to the preferred embodiment the actuator comprises an adjustment device enabling an adjustment of the position of the holes at the rear end each of the actuator lateral walls around the fixed axis.

Preferably the adjustment device comprises:
a chamber fixedly attached at the rear end of the actuator between the two lateral walls
a chamber fixedly attached to the fixed axis,
the two chambers being dimensioned and positioned one relative to the other so that the chamber fixedly attached at the rear end of the actuator is able to slide in the chamber fixedly attached to the fixed axis, and to define a close volume,
a spring positioned inside the closed volume defined by the two chambers.

Preferably the force of the spring is set such that the chamber fixedly attached at the rear end of the actuator is forced to slide in the chamber fixedly attached to the fixed axis and as a consequence the holes at the rear end of each of the actuator lateral walls are able to slide around the fixed axis.

Preferably the handle, the two lateral walls and the chamber fixedly attached at the rear end of the actuator between the two lateral walls of the actuator are made of one single piece of material.

Generally the capsule used in the machine of the present invention comprises an enclosure in which beverage ingredients are contained. These ingredients can be for example selected in the following list: tea leaves, herbal or fruit tea leaves, roast and ground coffee, soluble beverage ingredients, . . . The enclosure is usually a cup-shaped housing which can encompass different cross sections such as triangular, circular, ellipsoid, egg-shaped, square, rectangular or polygonal section. The enclosure is usually closed by a cover, preferably a plane cover. The capsule of the present invention usually presents a rim at the edge of the enclosure. The cover can be fixed on this rim. The capsule is preferably made of a material sufficiently rigid (either due to its nature or to its thickness) so that it is not deformed by the friction means of the first capsule engagement member when it is engaged in said member. Otherwise the friction force could not be sufficiently strong to retain the capsule during the movement of the first capsule engagement member.

According to the invention the displaceable capsule engagement member comprises an element having the shape of a hollow bell member and the capsule presents an enclosure outer shape that is conformal to at least a portion of said hollow bell member. By "conformal", it is meant that the capsule outer shape is defined in order to match at least a portion of the hollow bell shape outer shape. Thus at least a part of the outer contour of the capsule can be housed in the hollow bell member.

BRIEF DESCRIPTION OF THE DRAWINGS

The characteristics and advantages of the invention will be better understood in relation to the following figures, wherein.

DETAILED DESCRIPTION OF THE DRAWINGS

Figure 1:
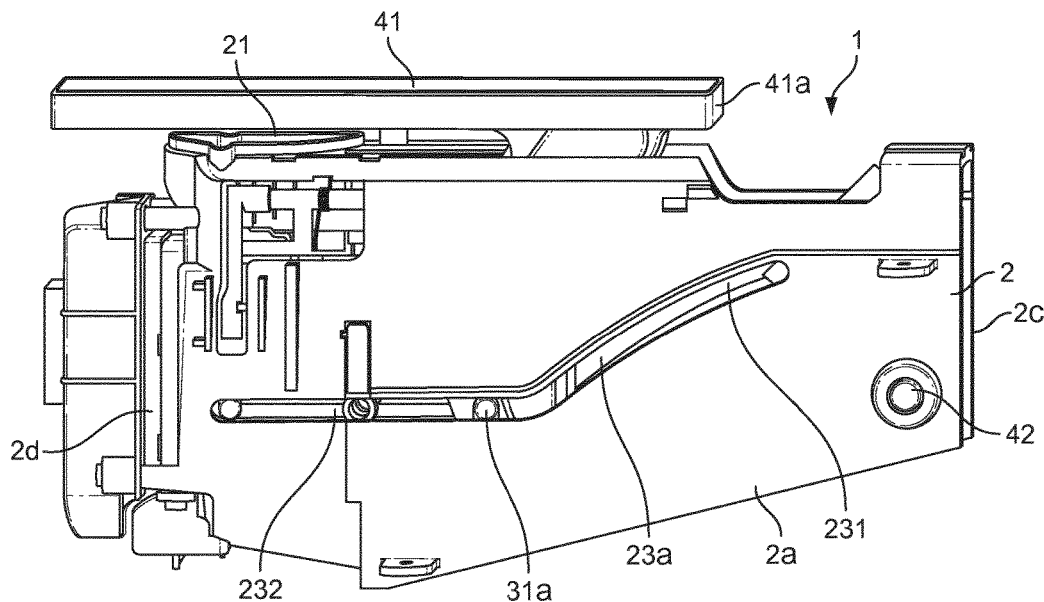
FIG. 1 is a side view of a module for introducing a capsule, positioning the capsule for the beverage preparation and ejecting the capsule in a beverage preparation apparatus according to the present invention, FIG. 2 corresponds to FIG. 1 except that the module housing is transparent.

FIG. 1 illustrates a module 1 of a beverage preparation apparatus according to the present invention. The module enables the introduction and the positioning of a capsule for the preparation of a beverage and the ejection of the capsule. The module is illustrated in the position for the preparation of a beverage. The module comprises a housing 2. FIG. 1 shows the lateral wall 2a and the rear and front ends 2c, 2d of the housing. At its top it presents an upper opening 21 designed for introducing a capsule in the machine near the housing front end 2d. The upper opening 21 is closed by a handle 41. The lateral wall 2a comprises a guiding curve 23a in which a guiding pin 31a can slide. The other housing lateral wall 2b comprises the same curve (see FIG. 3).

Figure 2:
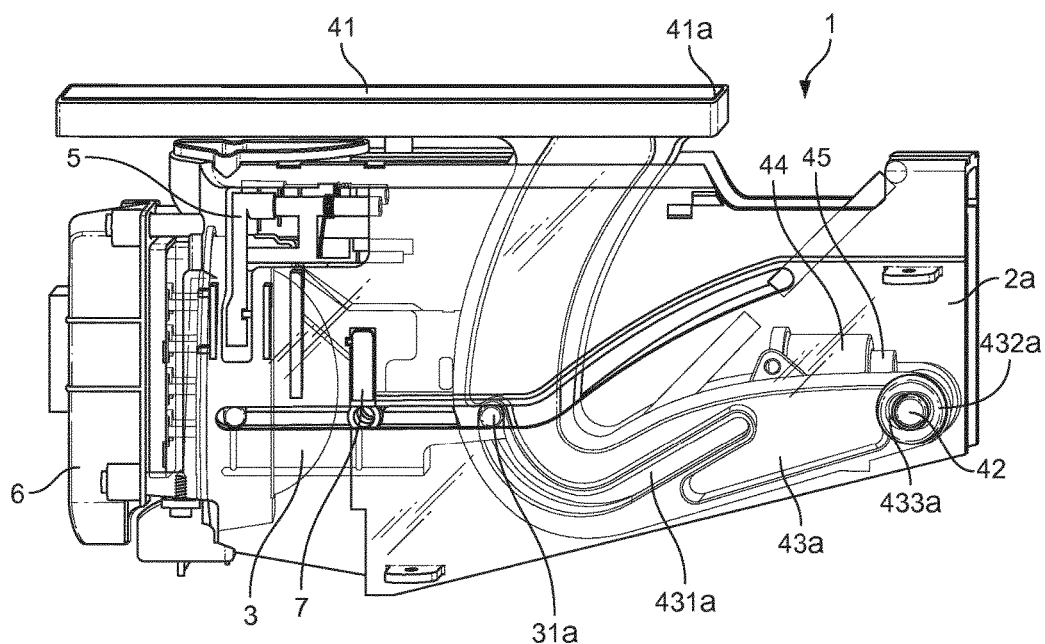

In FIG. 2 the housing 2 has been made transparent so that the internal parts of the module are made apparent. The module 1 comprises a capsule engagement member 3 in the second position for the preparation of a beverage near the housing front end 2d. At the front end the module comprises an identification member 6 for identifying the capsule engaged in the capsule engagement member 3.

The capsule engagement member 3 comprises two lateral guiding pins 31a, 31b each of the lateral guiding pins cooperating with one of the guiding curves 23a, 23b of the housing lateral walls 2a, 2b. These guiding curves are composed of two different segments: an essentially horizontal linear segment 232 near the front end 2d of the housing and an inclined linear segment 231 rising near the rear end 2c of the housing. By following these guiding curves 23a, 23b the lateral pins 31a, 31b of the capsule engagement member move said member according to the combination of a linear displacement near the front end 2d of the housing and an inclined displacement near the rear end 2c of the housing. This change of direction during the displacement of the capsule engagement member from the front end 2d to the rear end 2c creates a swivelling movement to disengage and eject the capsule. The ejection is also due to the presence of a pin 7 that slightly rises in the housing in order to engage the rim of the capsule when the capsule engagement member with the capsule engaged inside moves from the second position to the first position.

The module comprises an actuator that an operator actuates manually to prepare a beverage. The actuator comprises the handle 41 that can close the upper opening 21 and a fixed axis 42 perpendicularly attached between the housing lateral walls 2a, 2b at the housing rear end. The actuator is able to rotate around said fixed axis. The actuator comprises two lateral walls 43a, 43b joining the rear end 41a of the actuator handle to the fixed axis 42 and each of said lateral walls comprises a guiding curve 431a, 431b cooperating with the lateral guiding pins 31a, 31b of the capsule engagement member.

Consequently the only movement of the actuator is a rotation of said actuator around the fixed axis 42 and this movement of the actuator 4 induces a movement of the capsule engagement member 3 due to the movement of the guiding pins 3a, 3b in the guiding curves 431a, 431b of the actuator.

Figure 3:
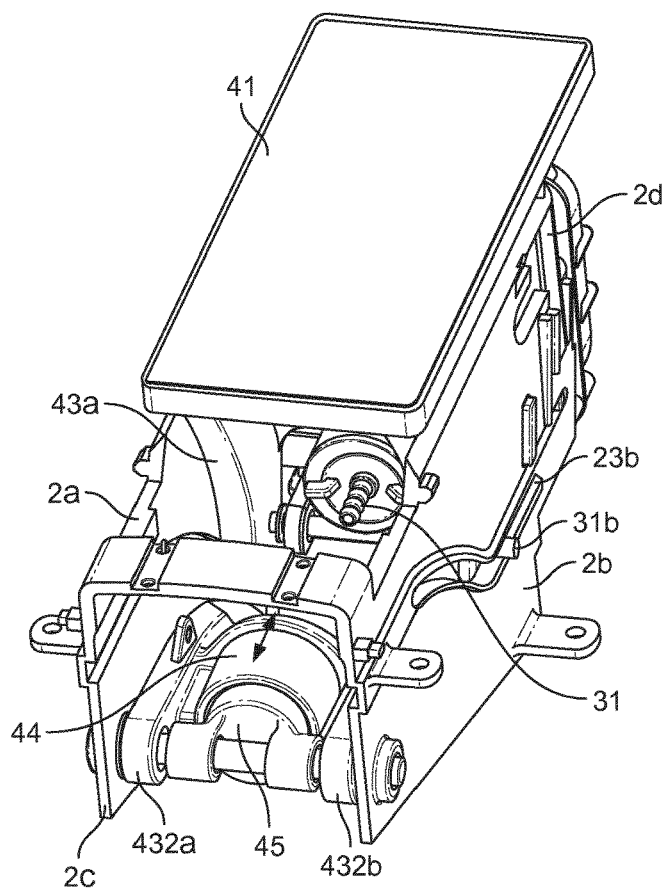
FIG. 3 is a top view of the rear side of the module of FIG. 1.

The movement of the actuator 4 is induced by the handle 41. Then when an operator wants to prepare a beverage:

he pulls up the handle 41 in order to remove it from the upper opening 21 of the housing. This movement of the handle induces the rotation of the actuator 4 around the fixed axis 42 clockwise in FIGS. 1 and 2. The lateral pins 31a, 31b are then pulled at the rear end 2c of the housing and the capsule engagement member 3 also which makes the space in the housing 3 under the upper opening 21 free for the introduction of the capsule. The capsule is retained inside said space by retaining arms 5.

then the operator begins to push the handle 41 in order to close the upper opening 21 as illustrated in FIGS. 1 and 2. This movement of the handle induces the rotation of the actuator 4 around the fixed axis 42 anticlockwise in FIGS. 1 and 2. The lateral pins 31a, 31b are then pulled in direction of the front end 2d of the housing and the capsule engagement member 3 also. During the movement the capsule engagement member 3 engages the capsule and frees it from the retaining arms 5. The movement goes on until the capsule reaches the front end 2d of the housing and comes into contact with the identifying member 6 as illustrated in FIG. 2. In this position a beverage can be prepared by introduction of fluid, usually hot water, in the capsule engagement member through the fluid supply 31 as illustrated in FIG. 3.

FIGS. 8a to 8e illustrates the following movement of the actuator for ejecting the capsule from the capsule engagement member.

FIGS. 3 to 7 illustrates the adjustment device which enables an adjustment of the relative position of the actuator 4 and the fixed axis 42. This adjustment aims at influencing the closing force acting between the actuator 4 and the fixed axis 42 when the actuator assumes the closed position that is when the capsule engagement member is pressed against the front end of the housing. This is of particular interest as the closing force may vary during operation and usage of the beverage preparation machine. In addition as the actuator and the fixed axis are generally made of plastic material, deformation or distortion of these components of the closing mechanism may occur during a long lifecycle of the machine such that the closing force decreases.

Moreover the components parts of the closing mechanism are generally manufactured and assembled automatically. Hence during production process a deviation regarding the measures of the components parts may occur which leads to discrepancy of the closing force when the components parts of the closing mechanism are assembled.

In the present invention the adjustment device enables the adjustment of the position of the holes 433a, 433b at the rear end each of the actuator lateral walls 43a, 43b around the fixed axis 42. In the illustrated embodiment the adjustment device comprises two chambers, one 44 being part of the actuator and the other 45 being attached to the fixed axis. The chambers are able to slide one into another to define a space in which a resilient component, preferably a spring 46, can be placed. Due to the possibility of one chamber to slide in the other the connection of the actuator 4 and the fixed axis 42 can work loose.

In the illustrated embodiment the chamber 44 is fixedly attached at the rear end of the actuator 4 between the two lateral walls 43a, 43b of the actuator and is opened at its rear end. The other chamber 45 is fixedly attached to the fixed axis 42. The axis 42 is fixedly attached between the housing lateral walls 2a, 2b at the housing rear end. Consequently the chamber 45 and the axis 42 cannot be moved. The chamber 45 is opened at its front end. This chamber 45 is smaller than the chamber 44 in the actuator. The both chambers 44, 45 are positioned in the middle of the housing lateral walls 2a, 2b so that the chamber 45 attached to the axis 42 can slide inside the chamber 44 of the actuator. A spring 46 is positioned in the space defined by both chambers in order to be compressed between the both chambers and in order to exert a force to distance the chamber 44 of the actuator away from the chamber 45 of the fixed axis.

Figure 4:
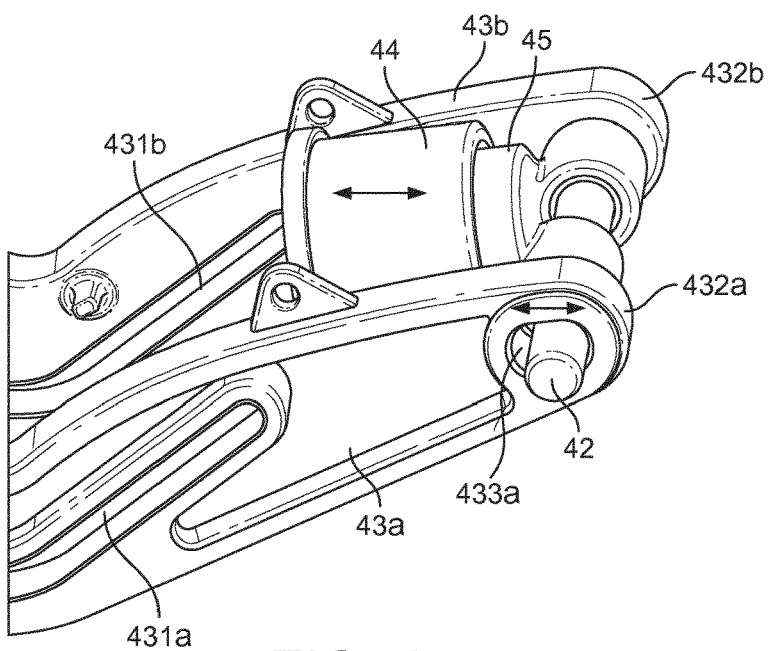
FIG. 4 is a view of the rear side of the actuator of the module of FIG. 1, FIGS. 5 and 6 are views of the actuator, the fixed axis and the adjustment device in the module of FIG. 1.

The holes 433a, 433b at the rear end each of the actuator lateral walls 43a, 43b in which the fixed axis 42 is positioned do not fit tightly around the fixed axis 42 as illustrated in FIG. 4. Yet due to the force exerted by the spring 46 the rear sides of the holes 433a, 433b are pulled to contact the fixed axis 42.

When the actuator is rotated the force exerted by the actuator 4 on the fixed axis 42 can be borne without damage at their point of contact since the adjustment device enables the holes 433a, 433b of the actuator to slide around the fixed axis by reaction of the spring to the force exerted by the actuator chamber 44 on it (two direction arrows in FIGS. 3 and 4 illustrate how the chambers can slide one around the other and the holes can slide around the axis).

The compression of the spring facilitates the movement of the handle when it comes to the position where the strongest force has to be exercised on it by the operator. The spring enables a small displacement (preferably less than 2 mm) and provides a soft feeling to the operator.

Moreover during the beverage preparation the force exerted by the spring maintains the capsule engagement member 3 closed against the front end of the housing and avoids that said capsule engagement member opened under the weak pressure increase inside the capsule when water is introduced in the capsule.

Figure 5:
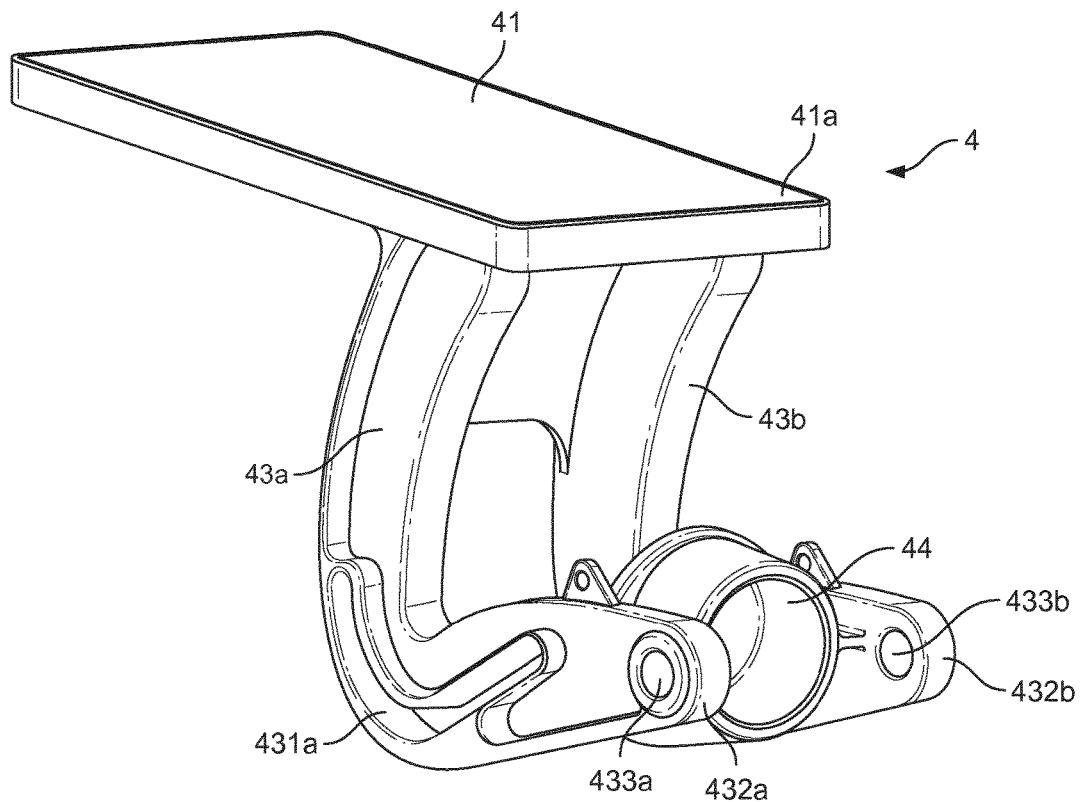
Figure 6:
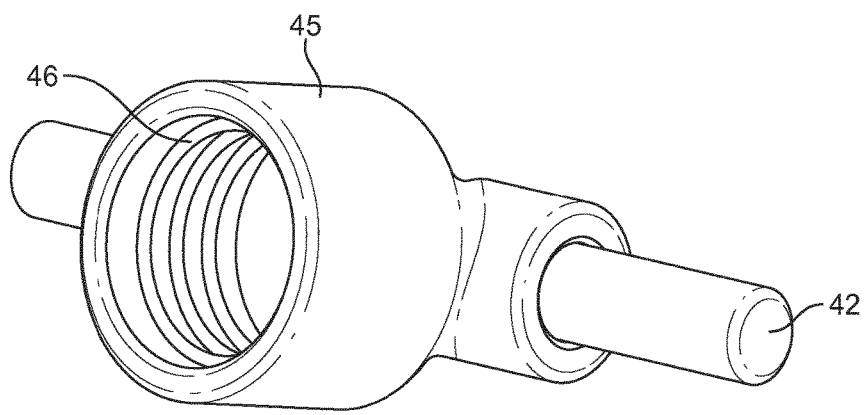
Figure 7:
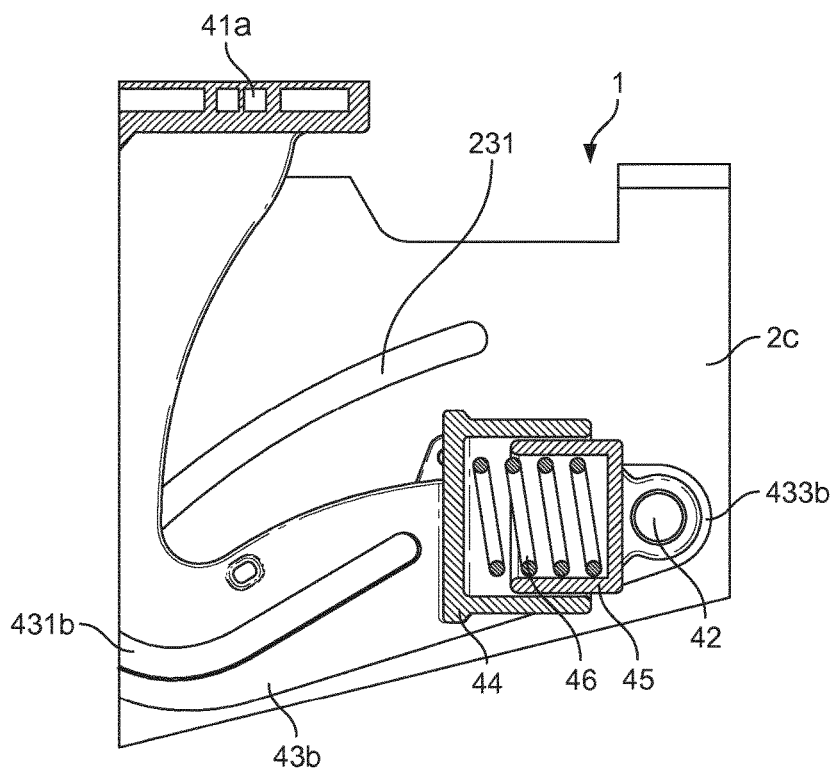
FIG. 7 is a longitudinal section view of the rear part of the module.
Figure 8A:
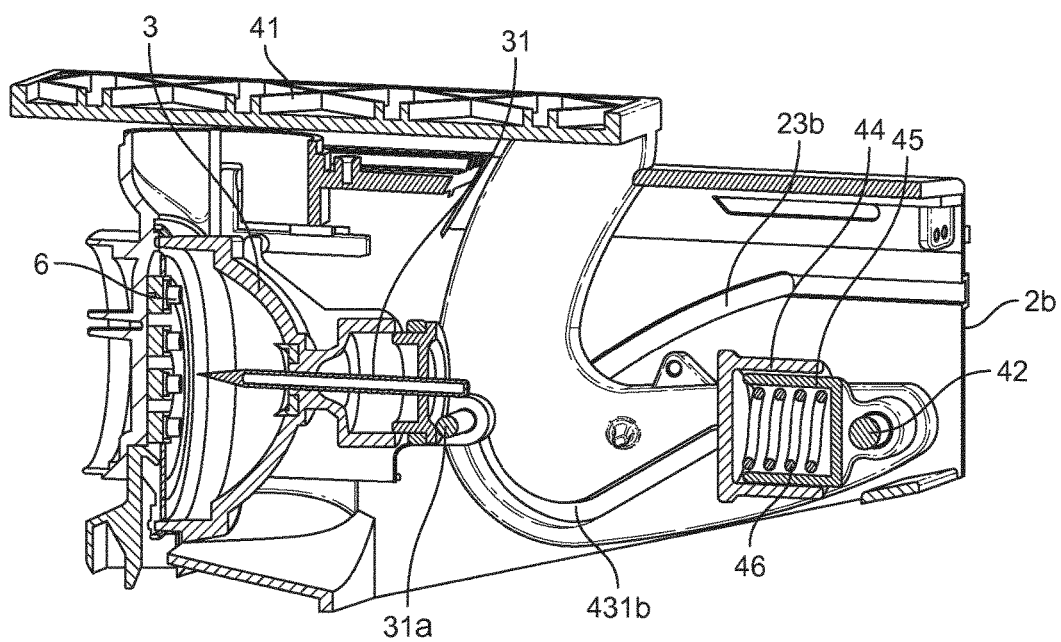
FIGS. 8a to 8e are longitudinal section views of the module during the opening movement of the handle.
Figure 8B:
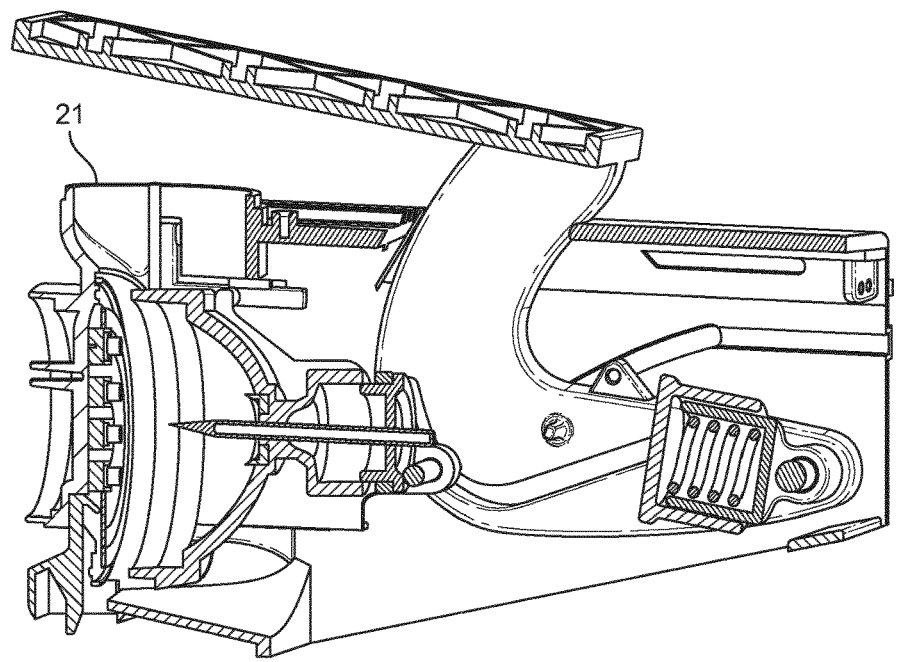
Figure 8C:
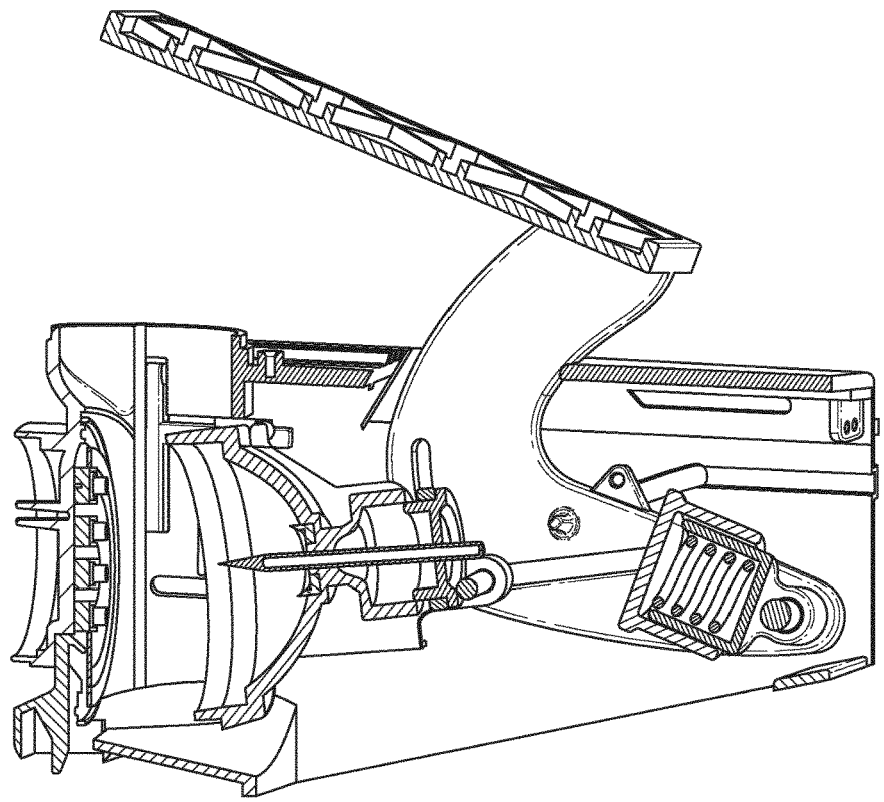
Figure 8D:
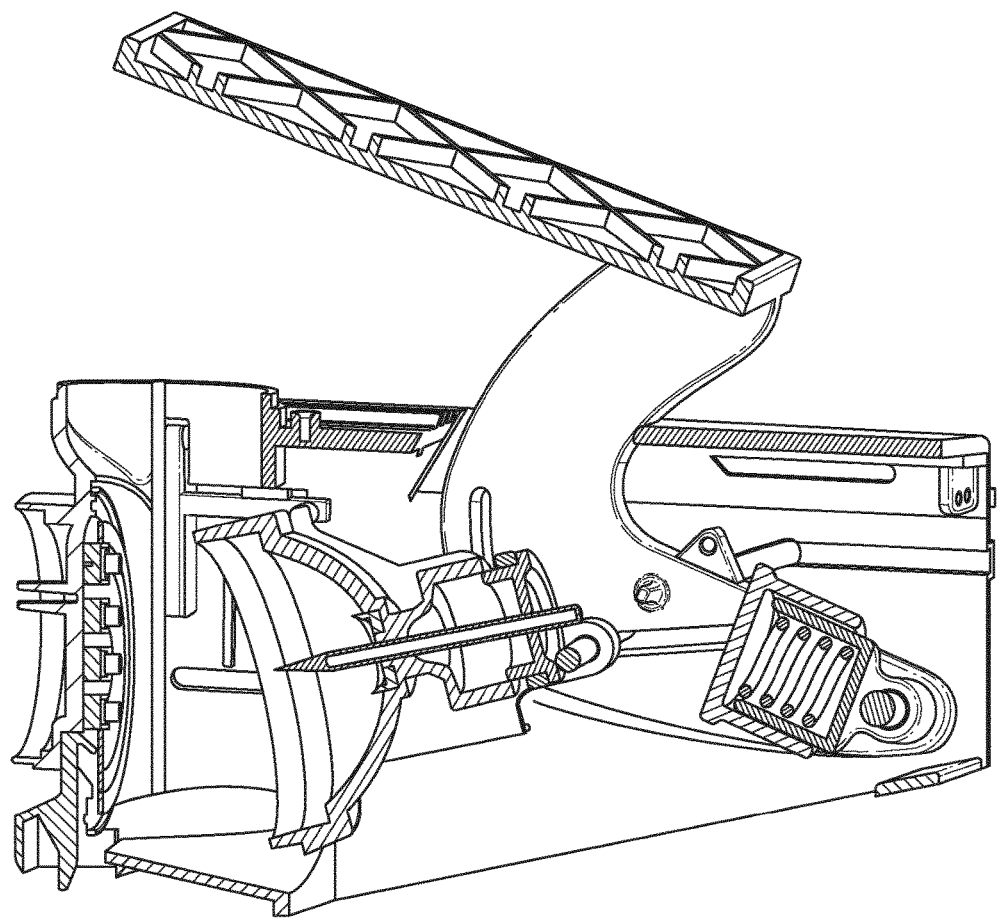
Figure 8E:
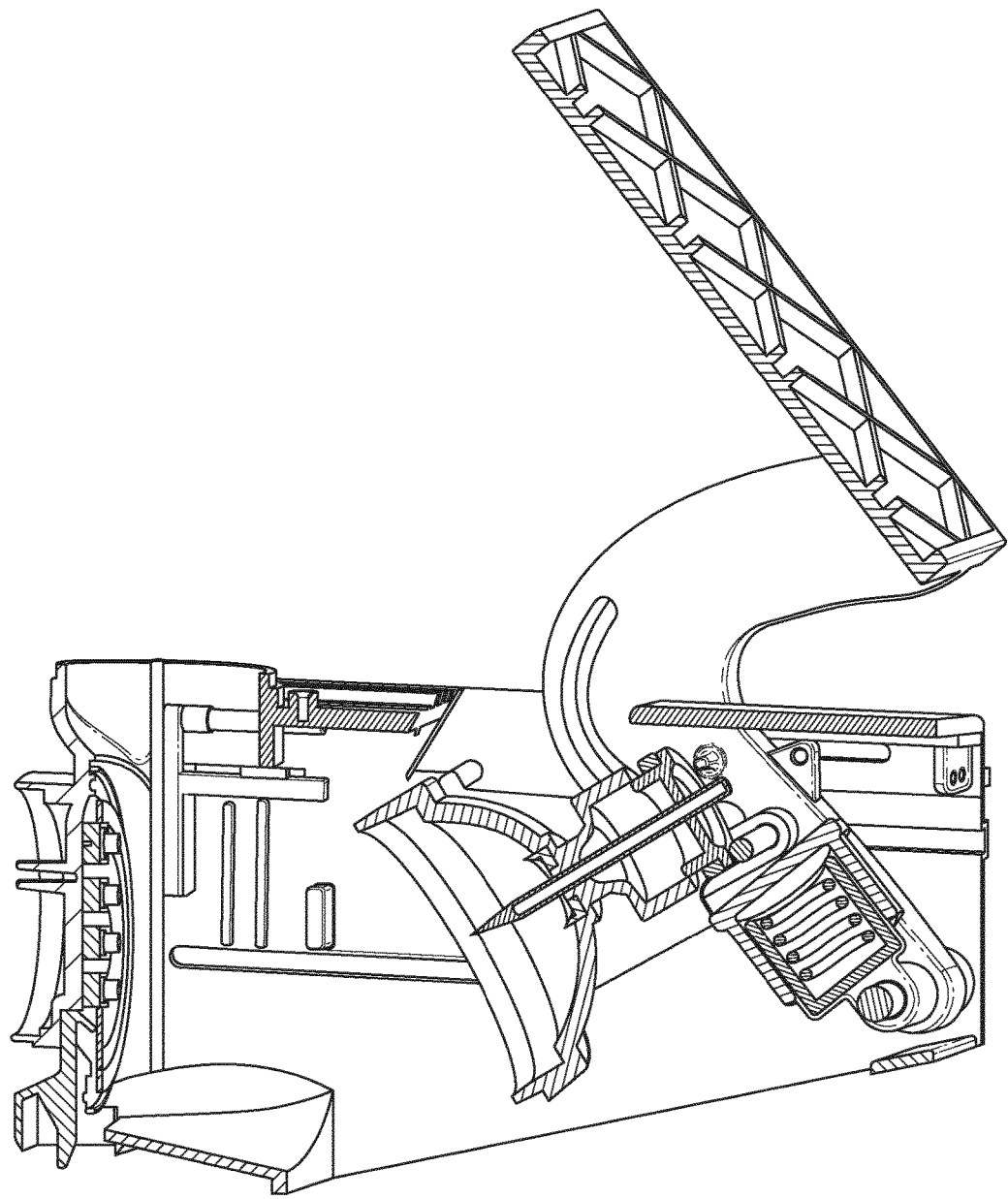

FIG. 5 illustrates the fact that the handle 41, the two lateral walls 43a, 43b and the chamber 44 fixedly attached at the rear end of the actuator are made of one single piece of material.

FIGS. 8a to 8e illustrate the displacement of the different internal elements of the module when the handle 41 is moved from the second position where it closes the housing upper opening designed for introducing a capsule—that is a position for preparing a beverage—to the first position where said opening is no more covered by the handle—that is a position where a capsule can be introduced in the module.

The machine of the present invention presents the advantage of providing a closing mechanism that comprises few components and enables lowest manufacturing costs.

The closing mechanism presents also the advantage of including an adjustment device of the closing force that prevents the damages of the components of the closing mechanism. Additionally this adjustment device does not need to be set at the end of the machine manufacturing steps. Consequently said step of manufacture can be deleted.

The invention claimed is:

1. A beverage production machine designed for producing a beverage from a capsule comprising a module for introducing the capsule in the machine, positioning the capsule for beverage preparation and ejecting the capsule, the module comprising:
   a housing having two lateral walls, rear and front ends, and one upper opening designed for introducing a capsule in the machine at the housing front end,
   a capsule engagement member configured to be displaced longitudinally within the housing lateral walls between two positions, comprising a first position being a capsule insertion or ejection opened position near the housing rear end and a second position being a beverage preparation closed position near the housing front end,
   an actuator comprising a handle designed for opening and closing the housing upper opening designed for introducing a capsule in the machine,
   wherein:
   each of the lateral walls of the housing comprises a guiding curve,
   the capsule engagement member comprises two lateral guiding pins, each of the lateral guiding pins cooperating with one of the guiding curves of the housing lateral walls, which cooperation is designed to displace the capsule engagement member between the two positions,
   the actuator comprises:
   a fixed axis perpendicularly attached between the housing lateral walls at the housing rear end, the actuator configured to rotate around the fixed axis, and
   two lateral walls joining the rear end of the actuator handle to the fixed axis, each of the actuator lateral walls comprising a guiding curve cooperating with the lateral guiding pins of the capsule engagement member.

2. The beverage production machine according to claim 1 wherein a design of the guiding curves inside the actuator lateral walls is such that the rotation of the handle around the actuator fixed axis induces the displacement of the capsule engagement member lateral guiding pins in the guiding curves of the housing lateral walls.

3. The beverage production machine according to claim 1 wherein the rear end of each of the actuator lateral walls comprises a hole in which the actuator fixed axis is engaged.

4. The beverage production machine according to claim 1 wherein the handle and the two lateral walls of the actuator are made of one single piece of material.

5. The beverage production machine according to claim 1 wherein the actuator further comprises an adjustment device enabling an adjustment of the position of the holes at the rear end each of the actuator lateral walls around the fixed axis.

6. The beverage production machine according to claim 5 wherein the adjustment device comprises:
- a first chamber fixedly attached at the rear end of the actuator between the two lateral walls,
- a second chamber fixedly attached to the fixed axis,
- the first and second chambers being dimensioned and positioned one relative to the other so that the first chamber fixedly attached at the rear end of the actuator is able to slide in the second chamber fixedly attached to the fixed axis and define a closed volume, and
- a spring positioned inside the closed volume defined by the two chambers.

7. The beverage production machine according to claim 1 wherein the handle, the two lateral walls of the actuator and the first chamber fixedly attached at the rear end of the actuator between the two lateral walls of the actuator are made of one single piece of material.

8. The beverage production machine according to claim 1 wherein the capsule engagement member comprises a fluid injection needle for opening and introducing a fluid in the capsule.

9. The beverage production machine according to claim 1 wherein the rear end of the capsule engagement member is connected to a fluid supply.

10. The beverage production machine according to claim 1 wherein the capsule engagement member presents a shape conformal to the capsule shape.

11. The beverage production machine according to claim 1 wherein the housing comprises arms for prepositioning the capsule.

\* \* \* \* \*